(12) United States Patent
Li (10) Patent No.: US 11,598,207 B1
(45) Date of Patent: Mar. 7, 2023

(54) METHODS FOR MONITORING GEL FLUID COMPOSITES

(71) Applicant: Saudi Arabian Oil Company, Dhahran (SA)

(72) Inventor: Wengang Li, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/559,299

(22) Filed: Dec. 22, 2021

(51) Int. Cl.
*E21B 47/06* (2012.01)
*E21B 49/08* (2006.01)
*E21B 47/135* (2012.01)
*C09K 8/504* (2006.01)

(52) U.S. Cl.
CPC ........ *E21B 49/0875* (2020.05); *C09K 8/5045* (2013.01); *E21B 47/135* (2020.05); *C09K 2208/10* (2013.01)

(58) Field of Classification Search
CPC ....................................................... E21B 47/06
See application file for complete search history.

(56) References Cited

U.S. PATENT DOCUMENTS

| | | | |
|---|---|---|---|
| 9,494,023 B2 * | 11/2016 | Turkenburg | E21B 43/16 |
| 10,280,737 B2 | 5/2019 | Gupta et al. | |
| 10,934,835 B2 | 3/2021 | Deville et al. | |
| 2014/0196894 A1 * | 7/2014 | Berkland | C09K 8/887 |
| | | | 507/225 |
| 2022/0276217 A1 * | 9/2022 | Schimmel | E21B 47/06 |

OTHER PUBLICATIONS

Almohsin et al., "Nanosilica Based Fluid System for Water Shut-Off", F06/IOR / EOR Maximizing the Development of Mature Fields, 22nd World Petroleum Congress, Istanbul, 2017.
Hu et al., "Silica—Plymer Dual Layer-Encapsulated Quantum Dots with Remarkable Stability", ACS Nano, vol. 4, No. 10, pp. 6080-6086, Sep. 23, 2010.
Kumar et al., "Covalently Dye-Linked, Surface-Controlled, and Bioconjugated Organically Modified Silica Nanoparticles as Targeted Probes for Optical Imaging", ACS Nano, vol. 2, No. 3, pp. 449-456, Mar. 7, 2008.

(Continued)

*Primary Examiner* — William D Hutton, Jr.
*Assistant Examiner* — Avi T Skaist
(74) *Attorney, Agent, or Firm* — Dinsmore & Shohl LLP (57) ABSTRACT

According to embodiments disclosed herein, a method of monitoring a gel fluid composite may include directing the gel fluid composite into a wellbore extending into a subsurface where the wellbore has one or more downhole fractures so that the gel fluid composite enters the one or more downhole fractures, transforming the gel fluid composite from an aqueous phase to a gel phase, irradiating light onto the gel fluid composite so that the fluorescent compounds emit one or more photons, and detecting the one or more photons using a detection device. The gel fluid composite may include a nanosilica gel that includes silica nanoparticles and an activator, wherein the silica nanoparticles have a maximum cross-sectional dimension of from 3 nm to 100 nm, and one or more fluorescent compounds, wherein the one or more fluorescent compounds are dispersed in the nanosilica gel, bonded to the silica nanoparticles, or both.

20 Claims, 4 Drawing Sheets

(56) References Cited

OTHER PUBLICATIONS

Navarro et al., "Correction: Labelling of N-hydroxysuccinimide-modified rhodamine B on cellulose nanofibrils by the amidation reaction", Royal Society of Chemistry, vol. 5, p. 8688, 2015.
Zhou et al., "Greener synthesis and optimization of highly photoluminescence Mn2+-doped ZnS quantum dots", Journal of Luminescence, vol. 158, pp. 176-180, 2015.

* cited by examiner

FIG. 4

METHODS FOR MONITORING GEL FLUID COMPOSITES

TECHNICAL FIELD

The present disclosure relates to hydrocarbon production from subterranean formations and, more specifically, to natural resource well drilling from subterranean formations.

BACKGROUND

There are numerous processes for well drilling into a subterranean formation for hydrocarbon production. Sometimes in such processes, a wellbore is formed in the subterranean formation. In some circumstances, fractures may exist in the subterranean formation that may allow unwanted substances into the wellbore system.

SUMMARY

The discovery and extraction of hydrocarbons, such as oil or natural gas, from subterranean formations may be impeded for a variety of reasons, such as produced water in a wellbore. Specifically, produced water is a significant concern for the oil and gas industry resulting in increased handling costs and oil recovery costs as well as affecting overall productivity through scale formation, corrosion of the field equipment, and potential formation failure. Many conventional water shut off methods include applying some form of a treatment fluid in the wellbore to prevent produced water from entering the wellbore. However, it is difficult to analyze how well the treatment fluid is at preventing produced water from entering the wellbore and the positional location of this treatment fluid. As such, new methods of detecting and evaluating the performance of water shut off agents are needed.

According to embodiments described herein, a gel fluid composite comprising silica nanoparticles and fluorescent compounds may be applied to one or more fractures in a wellbore in order to reduce or eliminate produced water from entering the wellbore. Whenever one wants to locate the position of the water shut off agent and further evaluate how well the gel fluid composite is at reducing produced water from entering the wellbore, light may irradiate the fluorescent compounds in the gel fluid composite and the fluorescent compounds may emit photons of light that can be detected by a detection device. The presence of the fluorescent compounds in the gel fluid composite makes determining the positional location of the gel fluid composite and evaluating its performance as a water shutoff agent much easier than many conventional treatment fluid evaluation processes.

According to one or more embodiments of the present disclosure, a method of monitoring a gel fluid composite may comprise directing the gel fluid composite into a wellbore extending into a subsurface, the wellbore comprising one or more downhole fractures so that the gel fluid composite enters at least one of the one or more downhole fractures, transforming the gel fluid composite from an aqueous phase to a gel phase, irradiating light onto the gel fluid composite so that the fluorescent compounds emit one or more photons, and detecting the one or more photons using a detection device. The gel fluid composite may comprise a nanosilica gel comprising silica nanoparticles and an activator, wherein the silica nanoparticles have a maximum cross-sectional dimension of from 3 nm to 100 nm, and one or more fluorescent compounds, wherein the one or more fluorescent compounds are dispersed in the nanosilica gel, bonded to the silica nanoparticles, or both.

These and other embodiments are described in more detail in the Detailed Description. It is to be understood that both the foregoing general description and the following detailed description present embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various embodiments and, together with the description, serve to explain the principles and operations of the invention. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and wherein.

DETAILED DESCRIPTION

The present disclosure is directed to a method of shutting off or reducing unwanted production of water within a subterranean formation using a gel fluid composite and detecting the positional location of the gel fluid composite. As used in the present disclosure, the term "subterranean formation" may refer to a body of rock that is sufficiently distinctive and continuous from the surrounding rock bodies that the body of rock can be mapped as a distinct entity. A subterranean formation may be sufficiently homogenous to form a single identifiable unit containing similar geological properties throughout the subterranean formation, including, but not limited to, porosity and permeability. A single subterranean formation may include different regions, where some regions include hydrocarbons and others do not. To produce hydrocarbons from the hydrocarbon regions of the subterranean formation, production wells are drilled to a depth that enables these hydrocarbons to travel from the subterranean formation to the surface.

The hydrocarbons from the hydrocarbon regions of the subterranean formation passes through fractures in the subterranean formation to reach a wellbore for extraction to the surface. As used in the present disclosure, the term "wellbore" may refer to the drilled hole or borehole, including the openhole or uncased portion of the well. Initially, the formation pressure may be considerably greater than the downhole pressure inside the wellbore. This differential pressure may drive hydrocarbons through fractures in the subterranean formation toward the wellbore and up to surface.

However, the wellbore may also be in fluid communication with water bearing zones within the subterranean formation. The term "fluid communication" may refer to when a wellbore is positioned near one or more fractures in the subterranean formation that allows water from the water bearing zone to contact or enter the wellbore system. As used in the present disclosure, the term "water bearing zones" may refer to the regions of the subterranean formation having water that occurs naturally within the pores of rock. The fractures within the subterranean formation which allows for hydrocarbons to flow to the wellbore may also allow formation water from the water bearing zones to flow to the wellbore.

Embodiments of the present disclosure include methods of forming a barrier to shut off or reduce unwanted production of water in the subterranean formation. The method includes directing (e.g., injecting) a gel fluid composite into one or more water producing fractures in the subterranean formation. In accordance with the present disclosure, the gel fluid composite may comprise a nanosilica gel comprising fluorescent compounds. As described herein, the fluorescent compounds may provide positional information regarding placement of the gel fluid composite in the subterranean formation, for example, in the one or more water producing fractures.

Figure 1A:
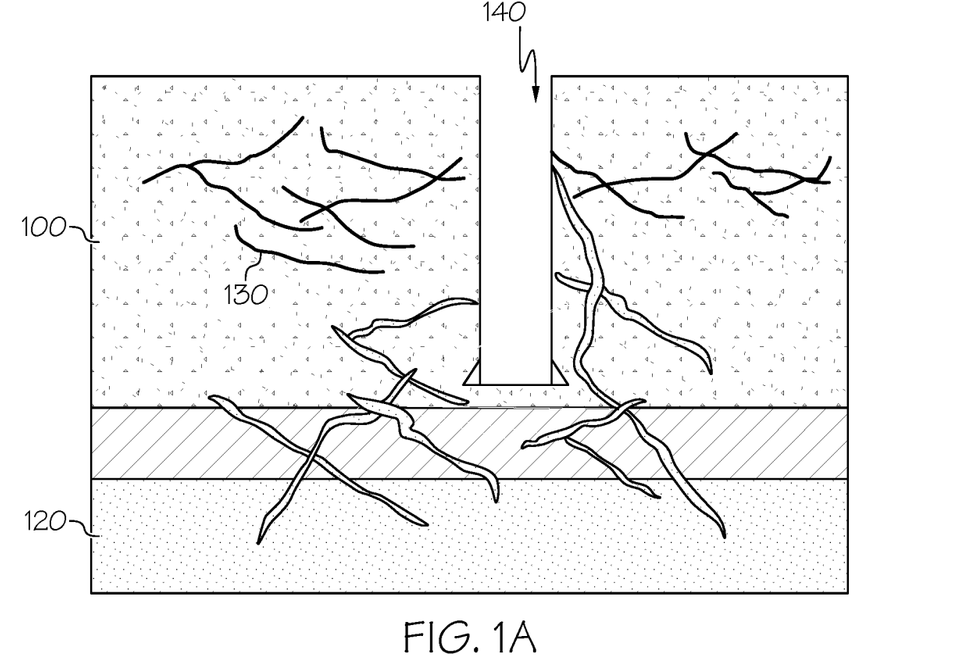
FIG. 1A schematically depicts a subterranean formation showing fractures connecting a wellbore and a water bearing zone, according to one or more embodiments shown and described herein.
Figure 1B:
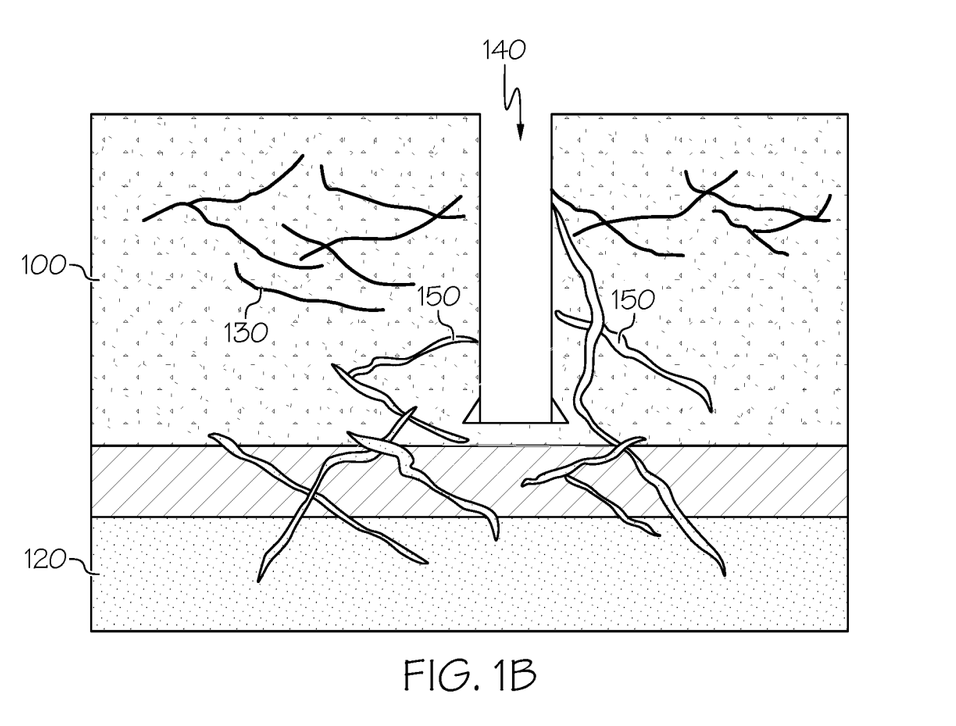
FIG. 1B schematically depicts the subterranean formation of FIG. 1A with the injection of a gel fluid composite into one or more fractures in the wellbore, according to one or more embodiments shown and described herein.

With reference to FIGS. 1A and 1B, a production well and associated fractures 130 are illustrated. The subterranean formation includes a hydrocarbon bearing zone 100 and a water bearing zone 120. The hydrocarbon bearing zone 100 is characterized by the region of the subterranean formation which includes recoverable hydrocarbons within the matrix of the subterranean formation. The water bearing zone 120 is characterized by the region of the subterranean formation having water that occurs naturally within the pores of rock. Each of the hydrocarbon bearing zone 100 and the water bearing zone 120 are interlaced with fractures 130 which facilitate flow of hydrocarbons, formation water, or both through the subterranean formation. To recover the hydrocarbons within the subterranean formation, a wellbore 140 is provided within the subterranean formation in fluid communication with the fractures 130.

The water bearing zone 120 of the subterranean formation may be sequestered from the wellbore 140 by introduction of a gel fluid composite 150 into water producing fractures in the subterranean formation. It will be appreciated that the water producing fractures are the fractures 130 which are in fluid communication with the water bearing zone 120 and the wellbore 140 and are thus capable of flowing formation water from the water bearing zone 120 to the wellbore 140. FIG. 1A provides an illustration of the subterranean formation prior to treatment in accordance with methods of the present disclosure and FIG. 1B provides an illustration of the water producing fractures obstructed with the gel fluid composite 150.

It will be appreciated that the fractures 130 interlaced throughout the subterranean formation may be naturally occurring or induced with enhanced oil recovery techniques such as fracturing operations. The methods for shutting off or reducing unwanted production of water in the subterranean formation with the gel fluid composite 150 of the present disclosure may be applied to all fractures 130 regardless of whether they are naturally occurring or induced with enhanced oil recovery techniques.

Forming a barrier to shut off or reduce unwanted production of water in a subterranean formation involves directing the gel fluid composite 150 in accordance with the present disclosure into one or more water producing fractures 130 in the subterranean formation. It will be appreciated that the gel fluid composite 150 may be injected into the water producing fractures 130 in accordance with methods and techniques familiar to those skilled in the art for placement of drilling or treatment fluids within the fractures 130 of a subterranean formation. In one or more embodiments, the gel fluid composite 150 may be directed (e.g., injected) into the water producing fractures 130 via coiled tubing and/or production tubing placed downhole of the wellbore 140. The gel fluid composite 150 may further be directed to the fractures 130 desired for treatment with the placement of bridge plugs or other devices to direct or obstruct flow.

As used throughout this disclosure, the term "production tubing" refers to a wellbore tubular used to produce reservoir fluids. Production tubing is assembled with other completion components to make up the production string that serves as the conduit through which the production fluid flows from the oil reservoir to the surface. The production tubing selected for any completion should be compatible with the wellbore geometry, reservoir production characteristics, and the reservoir fluids.

As used throughout this disclosure, the term "coiled tubing" refers to a long, continuous length of pipe wound on a spool. The pipe is straightened prior to pushing into a wellbore 140 and rewound to coil the pipe back onto the transport and storage spool. It will be appreciated that coiled tubing may be 5,000 meters or greater in length. Coiled tubing may be provided as a secondary and separate conduit through the wellbore 140 and may be passed within the annulus of the production tubing. Coiled tubing may also be used as part of the production tubing.

In one or more embodiments, the nanosilica gel may be in an aqueous phase. The term "aqueous phase" may refer to a substance being mixed with one or more liquids, where at least one liquid may be, but is not limited to, water. The nanosilica gel in the aqueous phase may allow the gel fluid composite 150 comprising the silica nanoparticles and fluorescent compounds to flow into the fractures 130 present in the wellbore 140. In some embodiments, the nanosilica gel may comprise a polymer and/or a polymer precursor while in the aqueous phase and/or the gel phase.

In one or more embodiments, the nanosilica gel may be in a gel phase. The term "gel phase" may refer to when a material is in a semi-solid state that comprises a substantially dilute cross-linked system that exhibits no flow when in steady state. In some embodiments, the nanosilica gel comprising the silica nanoparticles and fluorescent compounds may transfer from the aqueous phase to the gel phase. In some embodiments, the nanosilica gel may enter one or more fractures 130 in the wellbore 140 while in the aqueous phase and, after contacting surfaces in the wellbore 140, surfaces in the fractures 130, increasing the temperature of the nanosilica gel, or a combination of these, a gelation reaction may occur transforming the nanosilica gel in the aqueous phase in the fractures 130 to the gel phase. For example, in one or more embodiments, the nanosilica gel may comprise a polymer solution that, when the nanosilica gel contacts the fractures 130 in the wellbore 140 and/or when the nanosilica gel is subjected to an increase in temperature, the nanosilica gel initiates a gelation reaction to transform the nanosilica gel from the aqueous phase to the gel phase so that water can no longer enter the wellbore 140 through that fracture 130.

In one or more embodiments, the nanosilica gel of the gel fluid composite 150 is transformable from an aqueous phase to a gel phase. In the aqueous phase, the nanosilica gel comprises an aqueous dispersion of silica nanoparticles having a viscosity of greater than 1 centipoise (cp) to less than 10 cp. That is, in the aqueous phase, the nanosilica gel comprises a greater viscosity than water (i.e., greater than 1 cp) but a low enough viscosity to flow freely into the one or more fractures 130. In the gel phase, the nanosilica gel comprises a viscosity of 10 cp or greater, such as 25 cp or greater, 50 cps or greater, 100 cps or greater, 200 cps or greater, 500 cps or greater, 1000 cps or greater, or the like. Indeed, in the gel phase, the viscosity of the nanosilica gel is high enough to seal the one or more fractures 130 and operate as a water shutoff agent.

In operation, the nanosilica gel may transform from the aqueous phase to the gel phase after a gelation period in which the nanosilica gel is subject to a gelation temperature. In some embodiments, the gelation period may comprise from 30 minutes to over 600 minutes. In one or more embodiments, the gelation period may comprise 30 minutes, may comprise 60 minutes, may comprise 90 minutes, may comprise 120 minutes, may comprise 200 minutes, may comprise 300 minutes, may comprise 400 minutes, may comprise 500 minutes, may comprise over 600 minutes. The gelation temperature may be any temperature that transforms the nanosilica gel from the aqueous phase to the gel phase. The gelation temperature may comprise a temperature of 50° C. or greater. In one or more embodiments, the gelation temperature may comprise at least 50° C., at least 70° C., at least 100° C., at least 150° C., at least 200° C., at least 300° C., at least 400° C., or event at least 500° C.

In some embodiments, the nanosilica gel may comprise an activator. The activator may comprise sodium silicate or sodium chloride. The term "activator" may refer to a chemical compound that aids in transforming the nanosilica gel from the aqueous phase to the gel phase. In one or more embodiments, the presence of the activator in the nanosilica gel may aid in linking silica nanoparticles present in the nanosilica gel to form long chain-like networks and increase the viscosity of the nanosilica gel to the viscosity of the nanosilica gel in the gel phase.

In one or more embodiments, the detection device may be positioned in the wellbore 140 or positioned above the subsurface. Some examples of detection devices may be a florescence detector, a fluorometer, a spectrophotometer, or the like. After the fluorescent compounds in the nanosilica gel are irradiated with light from a light source, ultraviolet light, or light with a similar wavelength, may be emitted from the fluorescent compounds in the nanosilica gel. Next, the method includes determining positional information of the gel fluid composite 150 comprising the nanosilica gel and the fluorescent compounds in the subsurface based on the photons of light detected using the detection device and determining a sealing status of the one or more downhole fractures 130 of the wellbore 140 based on the positional information of the gel fluid composite 150.

Moreover, once the gel fluid composite 150 is directed into the wellbore 140, the gel fluid composite 150 may be irradiated after a gelation period. During the gelation period, the nanosilica gel 152 of the gel fluid composite 150 is subjected to a gelation temperature such that the nanosilica gel 152 transforms from an aqueous phase to a gel phase prior to irradiating the gel fluid composite 150. Waiting to irradiate the gel fluid composite 150 until after the gelation period allows the gel fluid composite 150 to increase in viscosity and seal the fractures 130 before determining the position of the gel fluid composite 150.

Referring generally to FIGS. 1A-4, the nanosilica gel may comprise silica nanoparticles. In some embodiments, the silica nanoparticles may comprise amorphous colloidal silica nanoparticles. The term "amorphous" refers to when the formed silica nanoparticles do not take on a clear, well-defined shape or form. The term "colloidal" refers to when the silica nanoparticles are suspended in a liquid, like water. The silica nanoparticles may comprise a spherical shape (although it should be understood that any shape that silica may take is contemplated). In one or more embodiments, the silica nanoparticles may form a silica network. The term "silica network" refers to multiple silica and/or silicate molecules that bond together to form an amorphous shape, usually spherical in nature. In some embodiments, at least one oxygen atom of a first silica or silicate compound may be bonded to a silicon atom of a second silica or silicate compound, where at least one oxygen atom of the second silica or silicate compound may be bonded to a silicon atom of a third silica or silicate compound where this bonding continues in order to form the silica network.

At least one hydroxyl group (—OH) may be bonded to a silicon atom that forms the silica network. The one or more hydroxyl groups may be bonded so that the one or more hydroxyl groups face externally outward from the core of the silica nanoparticle so that the one or more hydroxyl groups may bond to molecules outside of the formed silica network. The one or more hydroxyl groups may be bonded so that the one or more hydroxyl groups face internally towards the core of the silica nanoparticle so that the one or more hydroxyl groups may bond to molecules inside of the formed silica network. In one or more embodiments, the surface charge of the silica nanoparticle may be negative. As such, in one or more embodiments, a positively charged portion of a chemical compound may react and bond to a negatively charged portion of the silica nanoparticle. For example, rhodamine B is a chemical compound that contains at least one positively charged nitrogen atom. The at least one positively charged nitrogen atom of the rhodamine B compound may react and bond to at least one negatively charged portion of the silica nanoparticle, which may include the one or more internally or externally facing hydroxyl groups on the silica nanoparticle.

In some embodiments, the silica nanoparticles may comprise a maximum cross sectional dimension (e.g., diameter in spherical embodiments) of from 3 nm to 100 nm. For example, the silica nanoparticles may comprise a maximum cross sectional dimension of 3 nm, 5 nm, 8 nm, 10 nm, 12 nm, 15 nm, 20 nm, 25 nm, 30 nm, 35 nm, 50 nm, 75 nm, 100 nm, or any range having any two of these values as endpoints. The silica nanoparticles of the nanosilica gel may collectively comprise an average maximum cross sectional dimension (e.g., diameter in spherical embodiments) of from 8 nm to 20 nm. For example, the silica nanoparticles of the nanosilica gel may collectively comprise an average maximum cross sectional dimension of 8 nm, 10 nm, 12 nm, 14 nm, 16 nm, 18 nm, 20 nm, or any range having any two of these values as endpoints. In some embodiments, the silica nanoparticles may comprise from 40 wt. % to 95 wt. % of the nanosilica gel. For example, the silica nanoparticles may comprise 40 wt. %, 45 wt. %, 50 wt. %, 55 wt. %, 60 wt. %, 65 wt. %, 70 wt. %, 75 wt. %, 80 wt. %, 85 wt. %. 90 wt. %, 95 wt. % of the nanosilica gel, or any range having any two of these values as endpoints.

In one or more embodiments, the fluorescent compound may bond to the silica network of the silica nanoparticle so that the fluorescent compound is bonded to and located outside of the silica nanoparticle. In some embodiments, the fluorescent compound may bond to the silica network of the silica nanoparticle so that the fluorescent compound is bonded to and located inside of the silica nanoparticle. In some embodiments, the fluorescent compound may not bond to the surface of the silica nanoparticle and may be physically located inside or outside the formed silica network of the silica nanoparticle. For example, in one or more embodiments, the silica network of a silica nanoparticle may form an amorphous shape where at least one fluorescent compound is physically located inside the formed silica network of the silica nanoparticle and/or at least one fluorescent compound is physically located outside the formed silica network of the silica nanoparticle without bonding to the silica nanoparticle.

In some embodiments, the fluorescent compound may comprise any fluorescent chemical compound that may bond to at least a portion of the silica network of the silica nanoparticle, whether the fluorescent compound is located inside or outside of the silica network of the silica nanoparticle, and can emit light upon light excitation. In one or more embodiments, more than one type of fluorescent compound may be bonded to the silica nanoparticles and/or physically located inside or outside the silica network of the silica nanoparticles while not bonding to the silica nanoparticles. In some embodiments, the fluorescent compound may comprise one or more fluorescent dyes. For example, the fluorescent compound may comprise rhodamine, fluorescein, eosin, sulforhodamine, indocarbocyanine, merocyanine, auramine, phthalocyanine, combinations thereof, or the like.

Figure 2:
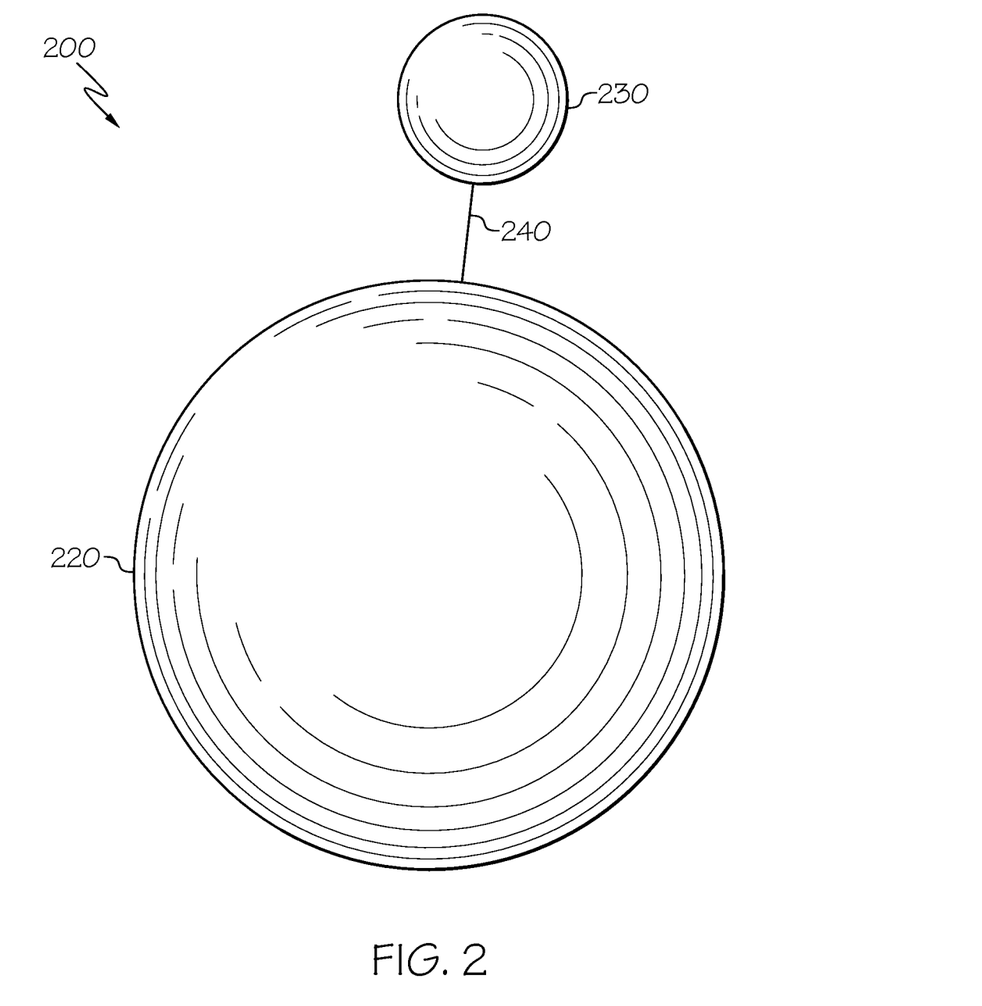
FIG. 2 schematically depicts a silica nanoparticle with an externally bonded fluorescent compound where a fluorescent compound is attached to the outside of a silica nanoparticle, according to one or more embodiments shown and described herein.

Referring now to FIG. 2, in one or more embodiments, the silica nanoparticles 220 may comprise one or more fluorescent compounds 230 that may form a bond 240 with the silica nanoparticle 220 to form a silica nanoparticle with an externally bonded fluorescent compound 200. The term "externally bonded" may refer to when a compound bonds to the silica nanoparticle 220 while outside the silica network of the silica nanoparticle 220. In some embodiments, the fluorescent compound 230 may be covalently bonded to the surface of the silica nanoparticles 220. The term "covalent bond" or "covalently bonded" refers to a chemical bond that involves the sharing of electron pairs between atoms. The process of forming the silica nanoparticles 220 and/or the process of forming the silica nanoparticles 220 that may comprise a fluorescent compound 230 bonded to the outside of the silica nanoparticles 220 may include the use of nucleophilic substitution, esterification, silane chemistry, vinyl polymerization, amidation, condensation, Diels-Alder addition, Gringard addition, a combinations of these, or similar reaction methods.

Figure 3:
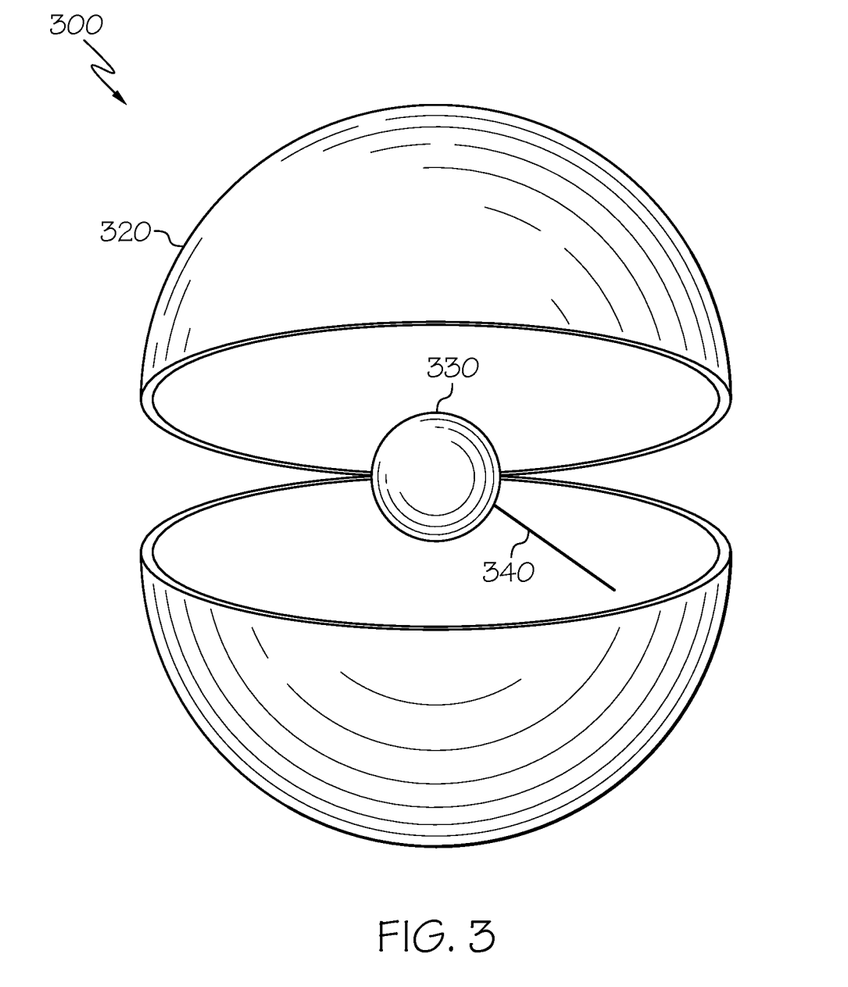
FIG. 3 schematically depicts a silica nanoparticle with an internally bonded fluorescent compound where a fluorescent compound is attached to the inside of a silica nanoparticle, according to one or more embodiments shown and described herein.

Referring now to FIG. 3, in one or more embodiments, the silica nanoparticles 320 may comprise one or more fluorescent compounds 330 that may form a bond 340 on the inside of the silica nanoparticle 320 to form a silica nanoparticle with an internally bonded fluorescent compound 300. The term "internally bonded" may refer to when a compound bonds to the silica nanoparticle 320 while inside the silica network of the silica nanoparticle 320. The process of forming the silica nanoparticles 320 and/or the process of forming the silica nanoparticles 320 that comprise a fluorescent compound 330 bonded to the inside of the silica nanoparticles 320 may include the use of nucleophilic substitution, esterification, silane chemistry, vinyl polymerization, amidation, condensation, Diels-Alder addition, Gringard addition, a combinations of these, or similar reaction methods.

Referring generally to FIGS. 1A-4, in some embodiments, a silane functional group may be added to the fluorescent compound to form a fluorescent-conjugated silane precursor so that the fluorescent-conjugated silane precursor can go through a co-condensation reaction with a silicate, ammonia, and water to form a silica network with the fluorescent compound covalently bonded to the outside and/or inside of the silica nanoparticles. The formation of the silica network to form the silica nanoparticles using this process may result in one or more fluorescent compound molecules being physically located inside and/or outside the silica network of the silica nanoparticles and not bonded to the silica nanoparticles. In some embodiments, the oxygen atom of the hydroxyl (—OH) portion of the carboxyl functional group of the fluorescent-conjugated silane precursor may form a covalent bond to a silicon atom in the silica network.

For example, in some embodiments, the fluorescent compound, which may comprise rhodamine B fluorescent dye, and a silane, which may comprise 3-aminopropyltriethoxysilane, may be dissolved in a nitrile, which may comprise acetonitrile, to form a reaction mixture. A carbodiimide, which may comprise 1-ethyl-3-(3-dimethylaminopropyl) carbodiimide (EDC), and an ester, which may comprise n-hydroxylsuccinimide (NHS), may be added to the reaction mixture and stirred in order to add a silane functional group to the fluorescent compound and form a fluorescent-conjugated silane precursor. Ammonia, an alcohol, which may comprise isopropanol, and water may be mixed to form a first solution. A silicate, which may comprise tetraethyl orthosilane (TEOS), and the fluorescent-conjugated silane precursor may be dissolved in an alcohol, which may comprise isopropanol, to form a second solution. The second solution may be added in dropwise to the first solution and stirred. This combination may initiate the formation of a silica network, where the fluorescent-conjugated silane precursor already has the fluorescent compound bonded so that the silica network of the formed silica nanoparticles have the fluorescent compound bonded to the outside and/or inside of the silica nanoparticles.

In another example, a silane may react with silica nanoparticles to form amino-functionalized silica nanoparticles (e.g., having an amino functional group (—NH$_2$) where the nitrogen atom covalently bonds to a silicon atom in the silica network resulting in an amino functional group bonded to the outside and/or inside of the silica nanoparticle), where the fluorescent compound, a carbodiimide, and an ester react with the amino-functionalized silica nanoparticles to replace the amino functional group bonded to the silica nanoparticle with the fluorescent compound molecule. In some embodiments, the oxygen atom of the hydroxyl (—OH) portion of the carboxyl functional group of the fluorescent compound may replace the amino functional group bonded to the silica nanoparticle and form a covalent bond to a silicon atom in the silica network of the silica nanoparticle. In some embodiments, this process may also result in the fluorescent compound physically located inside at least one silica nanoparticle and not bonded to the silica nanoparticle and/or physically located outside at least one silica nanoparticle and not bonded to the silica nanoparticle.

For example, in some embodiments, silica nanoparticles dispersed in an alcohol, which may comprise isopropanol, and a silane, which may comprise 3-aminopropyltriethoxysilane (APTES), may be combined and stirred in order to attach at least one —$NH_2$ amino functional group to the surface of at least one silica nanoparticle to form at least one amino-functionalized silica nanoparticle. The at least one amino-functionalized silica nanoparticle may then be dispersed in an alcohol, which may comprise isopropanol, in order to form a suspension. A fluorescent compound, which may comprise rhodamine B fluorescent dye, may be added to the suspension. A carbodiimide, which may comprise 1-ethyl-3-(3-dimethylaminopropyl)carbodiimide (EDC), and an ester, which may comprise n-hydroxylsuccinimide (NHS), may be added to the suspension. All reagents in the suspension may then be stirred and react to bond the oxygen atom of the hydroxyl (—OH) portion of the carboxyl functional group of the fluorescent compound to a silicon atom in the silica network of at least one silica nanoparticle, thus removing the at least one —$NH_2$ amino functional group bonded to the silica nanoparticle.

In some embodiments, a silicate may be added to a solution comprising ammonia, water, an alcohol, and a fluorescent compound in order to initiate the formation of a silica network, where the fluorescent compound may bond to the inside and/or outside of the silica nanoparticle. The oxygen atom of the hydroxyl (—OH) portion of the carboxyl functional group of the fluorescent compound may bond to a silicon atom in the silica network of at least one silica nanoparticle. In some embodiments, this process may result in at least one fluorescent compound being physically located inside the silica network of at least one silica nanoparticle and not bonded to the silica nanoparticle and/or at least one fluorescent compound being physically located outside the silica network of at least one silica nanoparticle and not bonded to the silica nanoparticle.

For example, in some embodiments, ammonia, the fluorescent compound, which may comprise rhodamine B fluorescent dye, an alcohol, which may comprise isopropanol, and water may form a first solution. A silicate, which may comprise tetraethyl orthosilane (TEOS), may be dissolved in an alcohol, which may comprise isopropanol, and form a second solution. The second solution may be added to the first solution, where the silicate goes through at least a hydrolysis and/or condensation reaction in order to initiate the formation of the silica network and form the silica nanoparticles. In some embodiments, the oxygen atom of the hydroxyl (—OH) portion of the carboxyl functional group of the fluorescent compound may bond to a silicon atom in the silica network of the silica nanoparticle, thus bonding the fluorescent compound to the inside and/or outside of the silica network of the silica nanoparticle.

Figure 4:
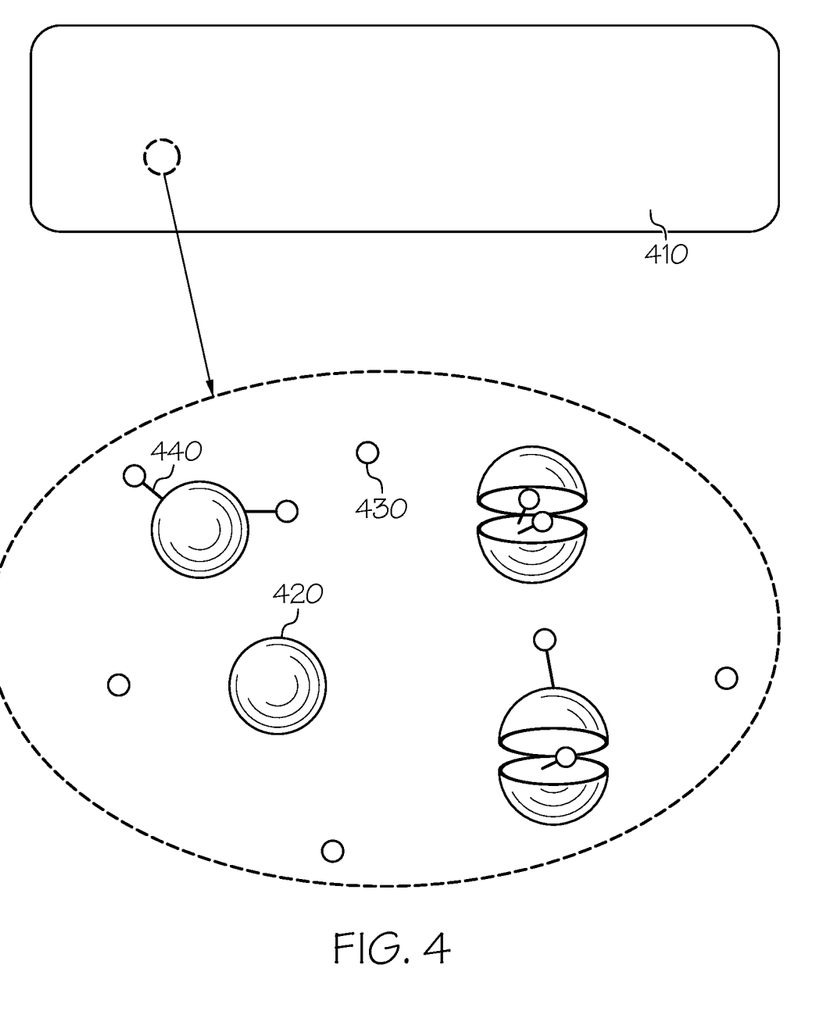
FIG. 4 schematically depicts a zoomed-in perspective of a nanosilica gel comprising silica nanoparticles, fluorescent compounds, and silica nanoparticles with fluorescent compounds attached, according to one or more embodiments shown and described herein.

Now referring to FIG. 4, in one or more embodiments, the nanosilica gel 410 may comprise the silica nanoparticles 420, the fluorescent compounds 430, and the silica nanoparticles 420 with fluorescent compounds 430 attached. The silica nanoparticles 420 may be chemically compatible with the nanosilica gel 410. The surface of the silica nanoparticles 420 may be chemically compatible with the nanosilica gel 410. The fluorescent compound 430 that may form a bond 440 with the silica nanoparticle 420 and/or be dispersed throughout the nanosilica gel 410 may be chemically compatible with the nanosilica gel 410. The term "chemically compatible" refers to when two substances can mix together and not undergo a chemical reaction. For example, in some embodiments, the surface of a silica nanoparticle 420, a fluorescent compound 430 bonded to the outside of a silica nanoparticle 420, a fluorescent compound 430 bonded to the inside of a silica nanoparticle 420, and/or a florescent compound dispersed throughout the nanosilica gel 410 may be present in the nanosilica gel 410 and the silica nanoparticle 420 and/or the fluorescent compound 430 may maintain the bonding it had before being mixed with the nanosilica gel 410.

In one or more embodiments, the nanosilica gel 410 may comprise silica nanoparticles 420 where the fluorescent compound 430 is bonded to the outside of the silica nanoparticle 420. In some embodiments, the nanosilica gel 410 may comprise silica nanoparticles 420 where the fluorescent compound 430 is bonded to the inside of the silica nanoparticle 420. In some embodiments, the nanosilica gel 410 may comprise silica nanoparticles 420 where at least one fluorescent compound 430 is bonded to the inside of the silica nanoparticle 420 and at least one fluorescent compound 430 is bonded to the outside of the silica nanoparticle 420. In some embodiments, the fluorescent compounds 430 may be dispersed throughout the nanosilica gel 410 without bonding to either the inside or outside of the silica nanoparticles 420. In some embodiments, the nanosilica gel 410 may comprise silica nanoparticles 420 where the fluorescent compound 430 is bonded to the outside of the silica nanoparticles 420, silica nanoparticles 420 where the fluorescent compound 430 is bonded to the inside of the silica nanoparticles 420, silica nanoparticles 420 where the fluorescent compound 430 is neither bonded to the inside nor outside of the silica nanoparticles 420, or a combination of these.

In one or more embodiments, the fluorescent compound 430 in the nanosilica gel 410 may emit one or more photons of light when irradiated with light from a light source. The light source may emit light of any wavelength onto the nanosilica gel 410 so that the fluorescent compound 430 then emits at least one photon of light. For example, the light source may emit ultraviolet light and the fluorescent compound 430 may emit ultraviolet light. Without being bound by a theory, in one or more embodiments, the fluorescent compound 430 that may be bonded to the silica nanoparticle 420 may be irradiated with light from a light source that may increase the energy state of the fluorescent compound 430 and then decrease the energy state of the fluorescent compound 430 so that the fluorescent compound 430 emits at least one photon of light. For example, a rhodamine B molecule that may be bonded to the silica nanoparticle 420 dispersed in the nanosilica gel 410 may be irradiated with ultraviolet light causing the energy state of the rhodamine B molecule to increase and decrease, thus emitting at least one photon of ultraviolet light.

EXAMPLES

Examples are provided herein which may disclose one or more embodiments of the present disclosure. However, the Examples should not be viewed as limiting on the claimed embodiments hereinafter provided.

Example 1—Method of Bonding a Fluorescent Dye to the Silica Nanoparticle—Silane Precursor Silica nanoparticles with rhodamine B fluorescent dye molecules bonded to the silica nanoparticles were prepared. First, a rhodamine-conjugated silane precursor, 5(6)-carboxy-X-rhodamine N-succinimidyl ester, was prepared by an EDC/NHS condensation reaction. 479 mg (1.0 mmol) of rhodamine B and 221 mg (1.0 mmol) of 3-aminopropyltriethoxysilane were dissolved in 10 mL of acetonitrile. This reaction mixture was stirred for 10 minutes. Then, 210 mg (1.1 mmol) of n-hydroxylsuccinimide (NHS) and 0.017 mg (1.1 mmol) of 1-ethyl-3-(3-dimethylaminopropyl)carbodiimide (EDC) were added to the reaction mixture. The reaction mixture was stirred overnight at room temperature. Lastly, the 5(6)-carboxy-X-rhodamine N-succinimidyl ester product was purified by flash column.

Next, the silica nanoparticles were prepared. First, 10.0 mg (0.0158 mmol) of 5(6)-carboxy-X-rhodamine N-succinimidyl ester, 4.19 mg (0.0189 mmol) of 3-aminopropyltriethoxysilane, 10 µL of neat trimethylamine, and 3.0 mL of dimethylformamide (DMF) were mixed. This reaction mixture was stirred for 12 hours at room temperature under $N_2$ atmosphere. The reaction mixture was concentrated under high vacuum. The resultant crude reaction mixture was triturated with an EtOAc-hexane mixture and then dried in a desiccator.

The silica nanoparticles with attached fluorescent dyes were then prepared using a modified Stöber process. 5.0 mL of aqueous ammonia (25 wt. %) was mixed with 80 mL of isopropanol and 20 mL of deionized water to form a reaction mixture. Tetraethyl orthosilane (TEOS) and 5(6)-carboxy-X-rhodamine N-succinimidyl ester were both dissolved in isopropanol in a volume ratio of 1:10 to form a solution. The formed solution was then added dropwise to the formed reaction mixture. The resulting mixture was stirred continuously for 2 hours at room temperature. The resulting mixture was centrifuged, washed with isopropanol 3 times, and then re-dispersed in deionized water.

Example 2—Method of Bonding a Fluorescent Dye to the Silica Nanoparticle—Surface Modification Silica nanoparticles with rhodamine B fluorescent dye molecules bonded to the silica nanoparticles were prepared. First, the silica nanoparticles were prepared using the modified Stöber process. The prepared silica nanoparticles were washed with isopropanol and deionized water. The prepared silica nanoparticles were then re-dispersed in 80 mL of isopropanol and 25 µL of 3-aminopropyltriethoxysilane (APTES) under rigorous stirring for 4 hours resulting in an amino functional group bonding to the outside of the silica nanoparticles. The amino-functionalized silica nanoparticles were re-dispersed in 80 mL of isopropanol to form a suspension. 5.0 mL of rhodamine B solution ($5*10^{-4}$ mol/L) was added to the suspension and then 10 mL of 1-ethyl-3-(3-dimethylaminopropyl)carbodiimide (EDC) solution (0.2 mol/L) and 10 mL of n-hydroxylsuccinimide (NHS) solution (0.2 mol/L) were added to the suspension dropwise. The suspension was stirred for 5 hours at room temperature, thus forming the silica nanoparticles with attached fluorescent dyes. The silica nanoparticles were then centrifuged, washed with isopropanol, and re-dispersed in deionized water.

Example 3— Method of Bonding a Fluorescent Dye to the Silica Nanoparticle—Dye Doping Silica nanoparticles with rhodamine B fluorescent dye molecules bonded to the silica nanoparticles were prepared. First, the silica nanoparticles were prepared using the modified Stöber process. 5.0 mL of aqueous ammonia (30 wt. %) and 5.0 mL of rhodamine B solution ($5*10^{-4}$ mol/L) were mixed with 80 mL of isopropanol and 20 mL of deionized water to form a reaction mixture. Tetraethyl orthosilane (TEOS) was dissolved in isopropanol in a volume ratio of 1:10 to form a solution. Then, this solution was added dropwise to the formed reaction mixture and stirred continuously for 2 hours at room temperature, resulting in the fluorescent molecules bonding to the inside of the silica nanoparticle. The reaction mixture was then centrifuged, washed with isopropanol 3 times, and re-dispersed in deionized water.

The present disclosure includes one or more non-limiting aspects. A first aspect includes a method of monitoring a gel fluid composite comprising directing the gel fluid composite into a wellbore extending into a subsurface, the wellbore comprising one or more downhole fractures so that the gel fluid composite enters at least one of the one or more downhole fractures, transforming the gel fluid composite from an aqueous phase to a gel phase, irradiating light onto the gel fluid composite so that the fluorescent compounds emit one or more photons, and detecting the one or more photons using a detection device. The gel fluid composite comprises a nanosilica gel comprising silica nanoparticles and an activator, wherein the silica nanoparticles have a maximum cross-sectional dimension of from 3 nm to 100 nm, and one or more fluorescent compounds, wherein the one or more fluorescent compounds are dispersed in the nanosilica gel, bonded to the silica nanoparticles, or both.

A second aspect includes any above aspect, wherein the fluorescent compounds are bonded to the outside of the silica nanoparticles.

A third aspect includes any above aspect, wherein the fluorescent compounds are bonded to the inside of the silica nanoparticles.

A fourth aspect includes any above aspect, wherein the fluorescent compounds are covalently bonded to the silica nanoparticles.

A fifth aspect includes any above aspect, wherein the fluorescent compounds are physically located inside the silica nanoparticles and do not bond to the silica nanoparticles.

A sixth aspect includes any above aspect, wherein the fluorescent compounds are physically located outside the silica nanoparticles and do not bond to the silica nanoparticles.

A seventh aspect includes any above aspect, wherein the fluorescent compounds comprise one or more fluorescent dyes chosen from rhodamine, fluorescein, eosin, sulforhodamine, indocarbocyanine, merocyanine, auramine, and phthalocyanine.

An eighth aspect includes any above aspect, wherein the fluorescent compounds have an average diameter of from 10 nm to 15 nm.

A ninth aspect includes any above aspect, wherein the silica nanoparticles comprise from 40 wt. % to 95 wt. % of the nanosilica gel.

A tenth aspect includes any above aspect, wherein the activator comprises sodium silicate or sodium chloride.

An eleventh aspect includes any above aspect, wherein the silica nanoparticles comprise amorphous colloidal silica nanoparticles.

A twelfth aspect includes any above aspect, wherein the gel fluid composite in the aqueous phase comprises an aqueous dispersion of silica nanoparticles having a viscosity of greater than 1 cp to less than 10 cp.

A thirteenth aspect includes any above aspect, wherein the gel fluid composite in the gel phase comprises a viscosity of 10 cp or greater.

A fourteenth aspect includes any above aspect, wherein a gelation period occurs between directing the gel fluid composite into the wellbore and irradiating the gel fluid composite and during the gelation period, the gel fluid composite is subjected to a gelation temperature so that the gel fluid composite transforms from the aqueous phase to the gel phase prior to irradiating the gel fluid composite.

A fifteenth aspect includes any above aspect, wherein irradiating light onto the gel fluid composite comprises irradiating light from a light source onto the gel fluid composite, where the light from the light source may comprise ultraviolet light.

A sixteenth aspect includes any above aspect, further comprising determining positional information of the gel fluid composite in the subsurface based on the one or more photons detected using the detection device.

A seventeenth aspect includes any above aspect, further comprising determining a sealing status of the one or more downhole fractures of the wellbore based on the positional information of the gel fluid composite.

An eighteenth aspect includes any above aspect, wherein the detection device may be positioned in the wellbore or above the subsurface.

A nineteenth aspect includes any above aspect, wherein the one or more downhole fractures allows water to enter the wellbore.

A twentieth aspect includes any above aspect, wherein directing the gel fluid composite into the wellbore extending into the subsurface reduces the water that enters the wellbore.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that where a first component is described as "comprising" a second component, it is contemplated that, in some embodiments, the first component "consists" or "consists essentially of" that second component. It should further be understood that where a first component is described as "comprising" a second component, it is contemplated that, in some embodiments, the first component comprises at least 10%, at least 20%, at least 30%, at least 40%, at least 50%, at least 60%, at least 70%, at least 80%, at least 90%, at least 95%, or even at least 99% that second component (where % can be weight % or molar %).

It is also noted that recitations herein of "at least one" component, element, etc., should not be used to create an inference that the alternative use of the articles "a" or "an" should be limited to a single component, element, etc.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

What is claimed is:

1. A method of monitoring a gel fluid composite, the method comprising:
   directing the gel fluid composite into a wellbore extending into a subsurface, the wellbore comprising one or more downhole fractures so that the gel fluid composite enters at least one of the one or more downhole fractures, wherein the gel fluid composite comprises:
      a nanosilica gel comprising silica nanoparticles and an activator, wherein the silica nanoparticles have a maximum cross-sectional dimension of from 3 nm to 100 nm;
      one or more fluorescent compounds, wherein the one or more fluorescent compounds are dispersed in the nanosilica gel, bonded to the silica nanoparticles, or both;
   transforming the gel fluid composite from an aqueous phase to a gel phase;
   irradiating light onto the gel fluid composite so that the fluorescent compounds emit one or more photons; and
   detecting the one or more photons using a detection device.

2. The method of claim 1, wherein the fluorescent compounds are bonded to the outside of the silica nanoparticles.

3. The method of claim 1, wherein the fluorescent compounds are bonded to the inside of the silica nanoparticles.

4. The method of claim 1, wherein the fluorescent compounds are covalently bonded to the silica nanoparticles.

5. The method of claim 1, wherein the fluorescent compounds are physically located inside the silica nanoparticles and do not bond to the silica nanoparticles.

6. The method of claim 1, wherein the fluorescent compounds are physically located outside the silica nanoparticles and do not bond to the silica nanoparticles.

7. The method of claim 1, wherein the fluorescent compounds comprise one or more fluorescent dyes chosen from rhodamine, fluorescein, eosin, sulforhodamine, indocarbocyanine, merocyanine, auramine, and phthalocyanine.

8. The method of claim 1, wherein the fluorescent compounds have an average diameter of from 10 nm to 15 nm.

9. The method of claim 1, wherein the silica nanoparticles comprise from 40 wt. % to 95 wt. % of the nanosilica gel.

10. The method of claim 1, wherein the activator comprises sodium silicate or sodium chloride.

11. The method of claim 1, wherein the silica nanoparticles comprise amorphous colloidal silica nanoparticles.

12. The method of claim 1, wherein the gel fluid composite in the aqueous phase comprises an aqueous dispersion of silica nanoparticles having a viscosity of greater than 1 cp to less than 10 cp.

13. The method of claim 1, wherein the gel fluid composite in the gel phase comprises a viscosity of 10 cp or greater.

14. The method of claim 1, wherein:
   a gelation period occurs between directing the gel fluid composite into the wellbore and irradiating the gel fluid composite; and
   during the gelation period, the gel fluid composite is subjected to a gelation temperature so that the gel fluid composite transforms from the aqueous phase to the gel phase prior to irradiating the gel fluid composite.

15. The method of claim 1, wherein irradiating light onto the gel fluid composite comprises irradiating light from a light source onto the gel fluid composite, where the light from the light source may comprise ultraviolet light.

16. The method of claim 1, further comprising determining positional information of the gel fluid composite in the subsurface based on the one or more photons detected using the detection device.

17. The method of claim 16, further comprising determining a sealing status of the one or more downhole fractures of the wellbore based on the positional information of the gel fluid composite.

18. The method of claim 1, wherein the detection device may be positioned in the wellbore or above the subsurface.

19. The method of claim 1, wherein the one or more downhole fractures allows water to enter the wellbore.

20. The method of claim 19, wherein directing the gel fluid composite into the wellbore extending into the subsurface reduces the water that enters the wellbore.

* * * * *